United States Patent
Silvery et al.

(10) Patent No.: US 12,206,294 B2
(45) Date of Patent: Jan. 21, 2025

(54) SENSOR FASTENER FOR MEASURING A TEMPERATURE IN AN ELECTRIC MACHINE OF A MOTOR VEHICLE

(71) Applicant: Schaeffler Technologies AG & Co. KG, Herzogenaurach (DE)

(72) Inventors: Christian Silvery, Walzbachtal (DE); Matthias Kästle, Lauf (DE); Marie-Luise Anke, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 376 days.

(21) Appl. No.: 17/639,075

(22) PCT Filed: Jul. 2, 2020

(86) PCT No.: PCT/DE2020/100581
§ 371 (c)(1),
(2) Date: Feb. 28, 2022

(87) PCT Pub. No.: WO2021/043352
PCT Pub. Date: Mar. 11, 2021

(65) Prior Publication Data
US 2022/0302799 A1    Sep. 22, 2022

(30) Foreign Application Priority Data
Sep. 6, 2019   (DE) .................... 10 2019 123 856.0

(51) Int. Cl.
*H02K 11/25*   (2016.01)
*H01R 25/16*   (2006.01)
*H02K 3/50*    (2006.01)

(52) U.S. Cl.
CPC ........... *H02K 11/25* (2016.01); *H01R 25/162* (2013.01); *H02K 3/50* (2013.01); *H01R 2201/10* (2013.01);
(Continued)

(58) Field of Classification Search
CPC ...... H02K 11/25; H02K 2203/09; H02K 3/50; H01R 25/162; H01R 2201/10; H01R 2201/26
See application file for complete search history.

(56) References Cited

U.S. PATENT DOCUMENTS

2012/0111145 A1   5/2012   Maekawa et al.
2012/0112581 A1   5/2012   Maekawa et al.
(Continued)

FOREIGN PATENT DOCUMENTS

CN   1202028 A     12/1998
CN   101682236 A   3/2010
(Continued)

*Primary Examiner* — Forrest M Phillips
(74) *Attorney, Agent, or Firm* — Volpe Koenig (57) ABSTRACT

The disclosure relates to a sensor fastener for measuring a temperature on a busbar assembly with a busbar, said assembly has at least one busbar assembly with at least one busbar. One or more busbars have bending elements, each of which has a free end; and a connecting ring for connecting to the busbar assembly. The bending elements extend through the connecting ring such that the free ends are free-standing in such a manner that the temperature of the free ends can be measured by a temperature sensor, thereby allowing a precise measurement of the temperature in a winding of an electric machine for a motor vehicle.

14 Claims, 4 Drawing Sheets

(52) U.S. Cl.
CPC ...... *H01R 2201/26* (2013.01); *H02K 2203/09* (2013.01)

(56) References Cited

U.S. PATENT DOCUMENTS

| | | | |
|---|---|---|---|
| 2018/0017446 A1* | 1/2018 | Yoshihara | H02K 11/25 |
| 2020/0220413 A1 | 7/2020 | Burmeister | |
| 2020/0393306 A1* | 12/2020 | Yoshihara | G01K 1/14 |

FOREIGN PATENT DOCUMENTS

| | | | |
|---|---|---|---|
| CN | 107210660 A | 9/2017 | |
| CN | 207353943 U | 5/2018 | |
| CN | 109586470 A | 4/2019 | |
| CN | 109586478 A | 4/2019 | |
| CN | 109792183 A | 5/2019 | |
| CN | 110999037 A | 4/2020 | |
| CN | 115694031 A | 2/2023 | |
| DE | 10 2017 217962 A1 | 4/2019 | |
| FR | 3046505 A1 | 7/2017 | |
| JP | 2013219913 A | 10/2013 | |
| JP | 2017046415 A2 | 3/2017 | |
| JP | 2018186608 A | 11/2018 | |
| JP | 2019110676 A | 7/2019 | |
| WO | 2009113632 A1 | 9/2009 | |

\* cited by examiner

SENSOR FASTENER FOR MEASURING A TEMPERATURE IN AN ELECTRIC MACHINE OF A MOTOR VEHICLE

CROSS-REFERENCE TO RELATED APPLICATIONS

This application is the U.S. National Phase of PCT Application No. PCT/DE2020/100581, filed on Jul. 2, 2020, which claims priority from German Patent Application No. DE 10 2019 123 856.0, filed on Sep. 5, 2019, the entire disclosures of which are incorporated by reference herein.

TECHNICAL FIELD

The disclosure relates to a sensor fastener with the aid of which a temperature sensor can be fastened in an electric machine of a motor vehicle in order to measure a temperature occurring in the electric machine.

BACKGROUND

Temperature sensors are used in electric machines, for example to monitor the temperature of individual components. In particular in the case of electric machines for driving a motor vehicle, temperatures of stator and rotor components have to be monitored. In electric machines with distributed windings, but also in machines with single-tooth windings, the temperature sensors are usually installed inside the stator, but where they are no longer accessible from outside for maintenance purposes. Various winding technologies for the stator of the electric machines are known for electric machines, in particular for hybrid vehicles and for electrical vehicles or for wheel hub drives. For a particularly dense or compact winding, for example, winding technologies such as so-called hairpin or bar-wave windings are used. It is difficult to measure the temperature of such windings, as they are very tightly wound or assembled, so that no temperature sensors can be inserted between the wires of the respective winding in order to measure the temperature of the winding. In this case, the temperature of the winding is measured on the radially outer side; however, lower temperatures occur here than at the radially inner edge of the winding so that a maximum temperature of the winding is measured that is too low.

SUMMARY

It is the object of the disclosure to identify measures that enable a precise measurement of a temperature in a winding of an electric machine, in particular for a motor vehicle.

The object is achieved according to the disclosure by a sensor fastener and by a stator assembly with the features disclosed herein. Preferred embodiments of the disclosure are specified in the following description.

According to the disclosure, a sensor fastener is thus provided for measuring a temperature on at least one busbar assembly with at least one busbar, said assembly being arranged in an electric machine with a rotational axis, for driving a motor vehicle, having at least One busbar assembly with at least one busbar, wherein one or more busbars have a plurality of bending elements, each row which has a free end;

One connecting ring for connecting to the busbar assembly, wherein the bending elements extend through the connecting ring such that the free ends of the bending elements are free-standing in such a manner that the temperature of the free ends can be measured by a temperature sensor.

The sensor fastener is thus designed to accommodate the temperature sensor in such a manner that it can detect the temperature directly at the free-standing free ends of the bending elements. It is no longer necessary to integrate the temperature sensor between the windings in a complicated manner.

In other words, a temperature sensor for temperature detection is integrated, arranged on at least one busbar and a connecting ring of an electric machine, for example with a hairpin or bar-wave winding. In this case, the temperature sensor is arranged with respect to the rotational axis of the electric machine, in particular radially to free ends of the bending elements.

A single temperature sensor does not have to cover all of the free ends of the bending elements. For example, a plurality of temperature sensors can also be used.

By appropriately positioning the temperature sensor directly on the connecting ring and between a plurality of wire or busbar ends of an electric machine, for example with a hairpin or bar-wave winding, a reliable heat transfer between the wire ends for measuring a temperature can be achieved. Such a heat transfer structure can then be encapsulated or insulated in a stator assembly.

This type of connection is advantageous in that the temperature sensor can be fastened to the connecting ring with a very simple and inexpensive connection to the busbars. Processes that have already been used are used further and no or a few further assembly steps are required.

The disclosure enables a permanent and constant thermal connection for recording the temperature of a winding, in particular a stator winding, of an electric machine. The winding can be, for example, a hairpin or a bar-wave winding. In addition, manufacturing and material tolerances as well as movements due to vibrations and temperature changes can be compensated for. The temperature of a stator winding of an electric machine can be recorded in a simple, inexpensive and yet reliable way.

Media flows, for example water, air or oil, do not affect the measurement of the temperature in the interior of the electric machine. The thermal conductivity properties of media flows can no longer affect the temperature as the distance from the winding or the winding head increases. A thermal connection of constant quality between the temperature sensor and the heat source to be monitored, for example the winding or the winding head, is ensured so that a constant temperature signal is measured.

The assembly and disassembly of the sensor fastener can be carried out quickly and easily.

The electric machine is designed in particular to introduce drive power into a drive train of the motor vehicle in motor operation to drive the motor vehicle or to drive an individual wheel of the motor vehicle as part of a wheel hub drive. When the electric machine is operating as a generator, drag torques acting on the electric machine can be used to generate electrical energy. The electric machine has a stationary stator and a rotor that rotates relative to the stator. The rotor can have permanent magnets that can interact electromagnetically with electromagnets of the stator in order to exchange a torque in motor operation and/or generator operation. The stator can have at least one stator lamination that covers the winding of the stator on one axial side. The winding can be electrically insulated from the stator lamination by means of insulation elements. The sensor fastener can in particular be plugged into an insulation layer containing the insulation elements in an intermediate space formed between the stator lamination and the winding. The winding is based in particular on a coil winding technology that enables high power density and high energy efficiency. The winding is preferably based on a hairpin or bar-wave winding. In the case of a bar-wave winding, the, in particular distributed, winding can be created in a kind of braiding process and then inserted into the stator slots. As a result, smaller cross-sections can be used, the possible number of slots can be increased and/or the effect of the current displacement losses can be reduced. The mounting position of the sensor fastener corresponds in particular to a relative position of the sensor fastener within the electric machine, in which the sensor fastener is to be installed together with the temperature sensor, in which the temperature sensor is essentially oriented in the radial direction of the electric machine and in its designated end position on the winding, in particular on the radially inner edge of the winding.

The temperature sensor can be designed, for example, as a thermistor, also known as an NTC resistor. A thermistor is a temperature-dependent resistor that belongs to the group of thermal resistors. It has a negative temperature coefficient as an essential property and conducts electrical current better at high temperatures than at low temperatures. Pure semiconductor materials, some composite semiconductors and various metallic alloys show thermoconductive behavior. NTC resistors made of metal oxides usually consist of pressed and sintered metal oxides of manganese, nickel, cobalt, iron, copper or titanium mixed with binders.

Alternatively, the temperature sensor can be designed, for example, a PTC thermistor, also known as a PTC resistor. A PTC thermistor is a temperature-dependent resistor that belongs to the group of thermal resistors. It has a positive temperature coefficient as an essential property and conducts the electrical current better at low temperatures than at high temperatures.

In principle, all metals have a positive temperature coefficient, so they are PTC thermistors; in contrast to the components dealt with in this regard, however, their temperature coefficient is significantly smaller and largely linear than that of the platinum measuring resistor used as temperature sensors because of its linearity.

The bending elements can be designed as wire or sheet metal elements.

According to a preferred embodiment of the disclosure, it is provided that the free ends of the bending elements for measuring a temperature are designed for contact with a temperature sensor. This means that there are as few interferences as possible, so that the temperature measurement is reliable.

In particular, the contact between the temperature sensor and the free ends of the bending elements takes place radially to the rotational axis of the electric machine. It has been found that the installation of the temperature sensor can be carried out easily and that the temperature measurement can be carried out reliably at the same time.

According to a preferred embodiment of the disclosure, it is provided that the sensor fastener is designed for a releasable connection to a temperature sensor, wherein the connecting ring preferably has connecting ring abutment means for interacting in a releasably connecting manner with temperature sensor abutment means of a temperature sensor. A releasable connection, i.e., a non-fixed connection, enables simple assembly and disassembly of the temperature sensor. In particular, the disassembly can be carried out non-destructively and cost-effectively.

According to a preferred embodiment of the disclosure, it is provided that the sensor fastener is designed for a force-fitting and/or form-fitting connection with a temperature sensor.

Force-fitting connections require a normal force on surfaces to be connected. Their mutual displacement is prevented as long as the counter-force caused by the static friction is not exceeded. The force or frictional connection is lost and the surfaces slip on each other if the tangentially acting load force is greater than the static friction force, for example between the wheel and the rail or road surface in vehicles with their own drive.

Form-fitting connections are created by the interlocking of at least two connection partners. As a result, the connection partners cannot disengage even with or without power transmission. In other words, in the case of a form-fitting connection, one connection partner is in the way of the other. Under operating loads, compressive forces act normally, i.e., at right angles to the surfaces of the connection partners. Such blocks occur in at least one direction. If a second homogeneous pair of surfaces is arranged opposite, the opposite direction is also blocked. If the pair consists of two mutually coaxial cylinder surfaces, there is a form fit in all directions of the plane perpendicular to the cylinder axis.

It has been found that force-fitting and/or form-fitting connections form cost-effective options for reliable temperature measurement.

It can optionally be provided that the connecting ring has connecting ring abutment means in order to interact in a connecting manner with temperature sensor abutment means of a temperature sensor. The connecting ring abutment means can be designed differently. A non-limiting example can be latches. Accordingly, the temperature sensor abutment means are designed to interact with the connecting ring abutment means. If the connecting ring abutment means are latches, for example, the temperature sensor abutment means can be abutment edges, for example, which are arranged on an outer area of the temperature sensor designed as a shrink tube. This is an embodiment that enables a reliable, easy-to-assemble and inexpensive sensor fastener.

Furthermore, it can optionally be provided that the bending elements are designed for interacting in a force-fitting and/or form-fitting connecting manner with a temperature sensor. Examples of this can be that the bending elements clamp the temperature sensor and/or enclose it in the sense of an undercut. This is an embodiment that enables a reliable, easy-to-assemble and inexpensive sensor fastener.

According to a preferred embodiment of the disclosure, it is provided that one or more bending elements are designed in such a way that their free ends are arranged radially offset from the rotational axis. The temperature sensor can thus be clamped between the free ends that are radially distant from one another. This increases the reliability of the temperature measurement.

Optionally, it can preferably be provided that the sensor fastener has connecting ring abutment means that are arranged radially offset to the rotational axis. A temperature sensor can be supported on the connecting ring abutment means on two sides, so that a reliable fixation of the temperature sensor is possible.

The temperature sensor can thus be arranged or fixed between the radially offset free ends and/or between the radially offset connecting ring abutment means. This does not exclude that free ends and/or connecting ring abutment means are arranged on the front side of the temperature sensor. Thus, the temperature can be measured on the end face, for example at a free end, and/or connecting ring abutment means can optionally be used as a stop or as latching means.

According to a preferred embodiment of the disclosure, it is provided that the sensor fastener is designed to receive a temperature sensor by means of a pushing movement, wherein the pushing movement extends along a pushing direction lateral to the rotational axis. Lateral to the rotational axis here means that the pushing direction is skewed to, i.e., not intersecting, the rotational axis. The pushing direction can be oriented, for example, as a tangent to a projection circle. It has been found that this enables a reliable connection and also a simple installation of a temperature sensor.

According to a preferred embodiment of the disclosure, it is provided that the sensor fastener has one or more connecting ring abutment means, which are designed as latching means and/or as stop means. This is an inexpensive and also reliable means of fastening and positioning a temperature sensor. The temperature sensor can, for example, be pushed in along a pushing direction or pressed in from above in such a manner that the latching means fix or latch the temperature sensor in a captive manner.

According to a preferred embodiment of the disclosure, it is provided that the busbar assembly has three busbars. The free ends of the bending elements can be from a single busbar or from a plurality of busbars. Thus, a temperature measurement of a plurality of busbars can be carried out.

The disclosure also relates to a temperature sensor with at least one of the aforementioned features. In particular, the temperature sensor can have contours that improve its housing in the sensor fastener. These contours can, in particular, be part of a shrink tube, for example as abutment edges for latching means and/or as guide rails for inserting and/or fixing the temperature sensor.

The disclosure further relates to a stator assembly having at least one sensor fastener for an electric machine with at least one of the aforementioned features, furthermore having at least one temperature sensor with at least one of the aforementioned features.

According to a preferred embodiment of the stator assembly, it is provided that the temperature sensor and the sensor fastener have an epoxy coating in the connected state. As a result, the temperature sensor is reliably connected to the sensor fastener. Furthermore, the stator assembly is protected from environmental influences, such that media flows, for example: water, air or oil, do not get directly onto the temperature sensor and thus do not influence it. Epoxy or epoxy resins are synthetic resins that carry epoxy groups. They are curable resins, i.e., reaction resins that can be converted into a thermosetting plastic with a hardener and, if necessary, other additives. The epoxy resins are polyethers, usually with two terminal epoxy groups. The hardening agents are reaction partners and together with the resin form the macromolecular plastic. Coatings with a similar effect can also be used as epoxy coatings for the purposes of the disclosure.

The thermosets produced by crosslinking have good mechanical properties as well as good temperature resistance and chemical resistance The disclosure also relates to an electric machine for electrically driving a motor vehicle with a stator assembly, which can be designed and developed as described above, and a rotor which can be coupled to a drive train of the motor vehicle and interacts with the electromagnets of the stator assembly.

BRIEF DESCRIPTION OF THE DRAWINGS

In the following, the disclosure is explained by way of example with reference to the accompanying drawings using preferred exemplary embodiments, wherein the features shown below can represent an aspect of the disclosure both individually and in combination. In the figures.

DETAILED DESCRIPTION

The disclosure relates to a sensor fastener 10 for measuring a temperature on at least one busbar assembly 12 with at least one busbar 12a, 12b, 12c, said assembly being arranged in an electric machine with a rotational axis, for driving a motor vehicle, having at least one busbar assembly 12 with at least one busbar 12a, 12b, 12c, wherein one or more busbars 12a, 12b, 12c have a plurality of bending elements 14a, 14b, 14c, 14d, 14e, 14f, 14g, each of which has a free end 16a, 16b, 16c, 16d, 16e, 16f, 16g;

one connecting ring 18 for connecting to the busbar assembly 12, wherein the bending elements 14a, 14b, 14c, 14d, 14e, 14f, 14g extend through the connecting ring 18 such that the free ends 16a, 16b, 16c, 16d, 16e, 16f, 16g of the bending elements 14a, 14b, 14c, 14d, 14e, 14f, 14g are free-standing in such a manner that the temperature of the free ends 16a, 16b, 16c, 16d, 16e, 16f, 16g can be measured by a temperature sensor 20.

Figure 1:
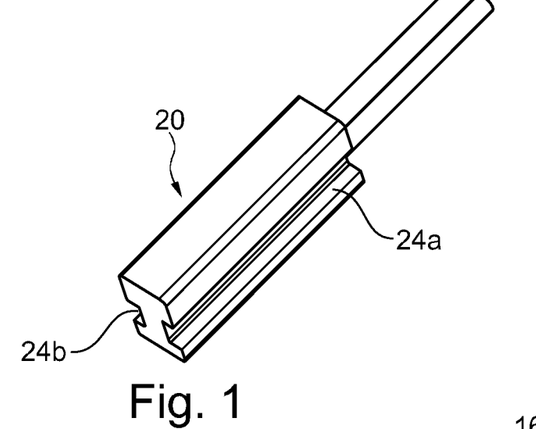
FIG. 1: shows a temperature sensor for connection to a sensor fastener according to a preferred embodiment of the disclosure.
Figure 2:
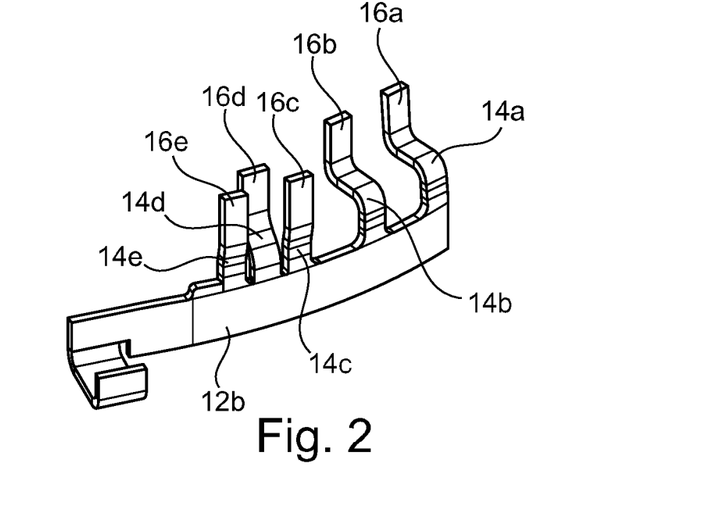
FIG. 2: shows a perspective view of a busbar of a sensor fastener of a preferred embodiment of the disclosure.
Figure 3:
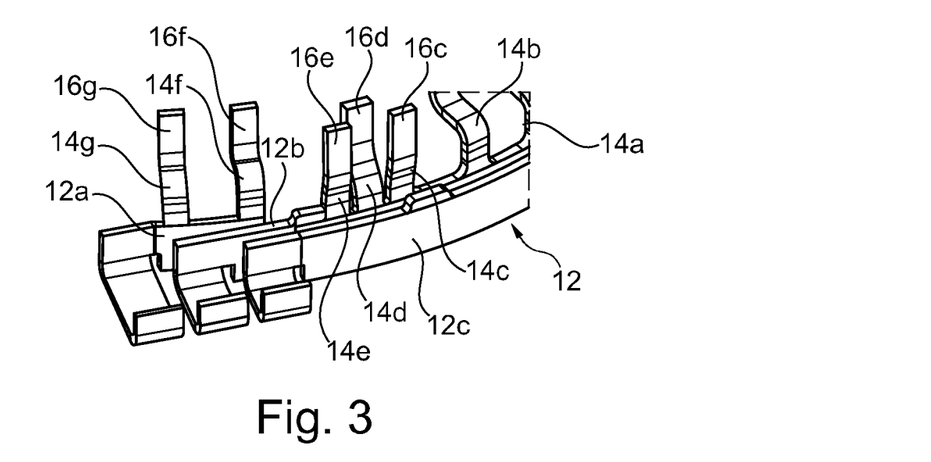
FIG. 3: shows a busbar assembly having three busbars of a sensor fastener of a preferred embodiment of the disclosure.
Figure 4:
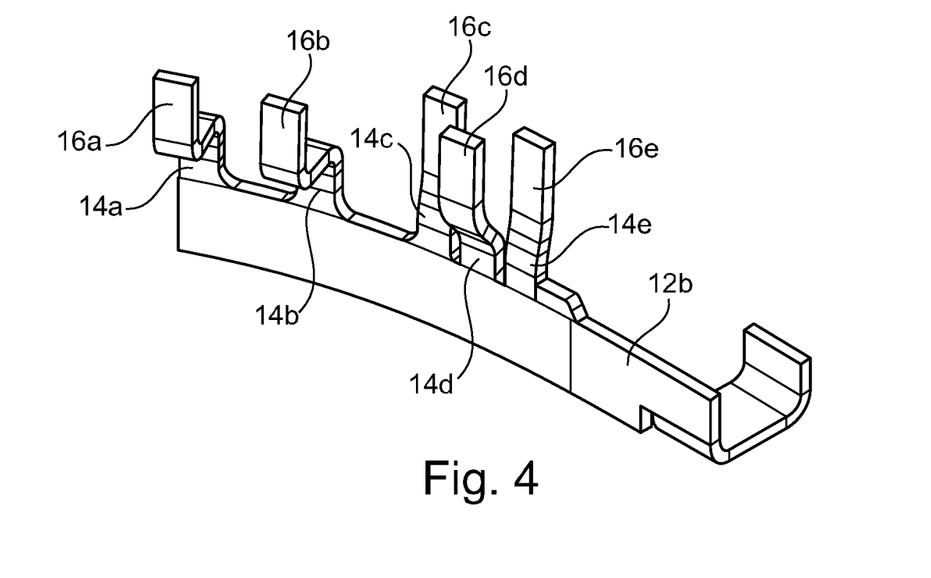
FIG. 4: shows the busbar according to FIG. 2 from another perspective view.
Figure 5:
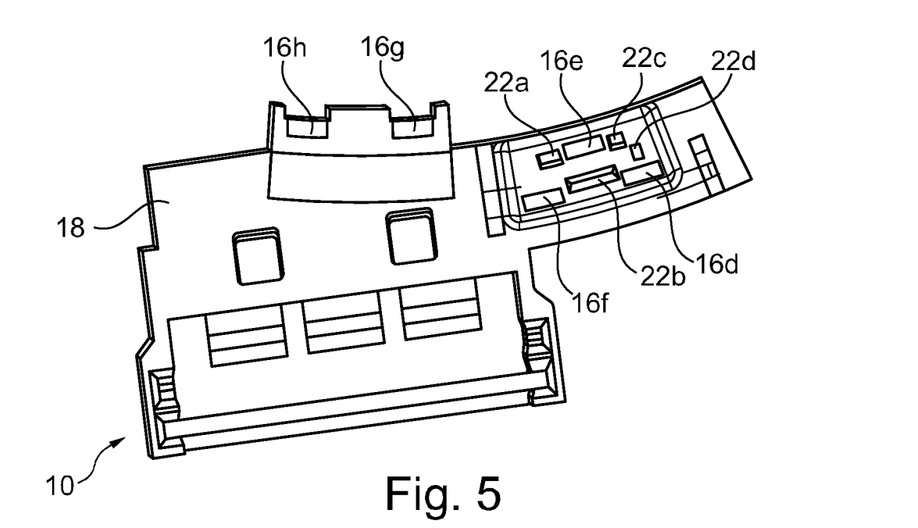
FIG. 5: shows a plan view of a sensor fastener according to a preferred embodiment of the disclosure.

FIGS. 1 to 4 show the inventive solution in its individual components, i.e., the temperature sensor in FIG. 1, the busbar arrangement 12 in FIG. 3 and a second busbar 12b of the busbar arrangement 12 in FIGS. 2 and 4. Furthermore, FIG. 5 shows a structural unit of the sensor fastener 10, wherein the busbar assembly 12 and the connecting ring 18 are joined together to form the sensor fastener 10. In an exemplary manner, FIGS. 6 to 9 disclose the functionality and assembly steps of the sensor fastener 10 when it is integrated into an electric machine and how the thermal connection of the temperature sensor 20 in the stator of the electric machine or between the wires is enabled and fixed.

The temperature sensor 20 is preferably designed as an NTC or PTC resistance element.

FIG. 1 illustrates the basic structure of a preferred temperature sensor 20. Here, the temperature sensor 20 is surrounded by a shrink tube. This shrink tube has, on each side, temperature sensor abutment means 24a, 24b, each designed as a guide shaft, used to fix the temperature sensor 20. This temperature sensor 20 is connected to a cable by means of a connection technology, for example by welding or crimping.

FIGS. 2 and 4 show a structure of a preferred busbar 12*b*. The busbar 12*b* is expanded compared to conventional busbars in order to be bent up in three directions. First, a sheet is conventionally shaped flat, for example by punching or laser cutting the sheet. Then the individual bending elements 14*a*, 14*b*, 14*c*, 14*d*, 14*e*, 14*f*, 14*g* are correspondingly reshaped and/or left unbent. For example, the bending element 14*d* is pulled radially inward, against the two closest bending elements 14*c*, 14*e*, in order to be able to position the temperature sensor 20 in such a way that an optimal heat transfer can take place.

FIG. 3 shows a busbar assembly 12 with three busbars 12*a*, 12*b*, 12*c* of an electric machine.

The busbar assembly 12 with three busbars 12*a*, 12*b*, 12*c* is, as shown in FIG. 5, surrounded by a plastic-like material. This also means that the busbar assembly 12 is connected to the connecting ring 18.

Figure 6:
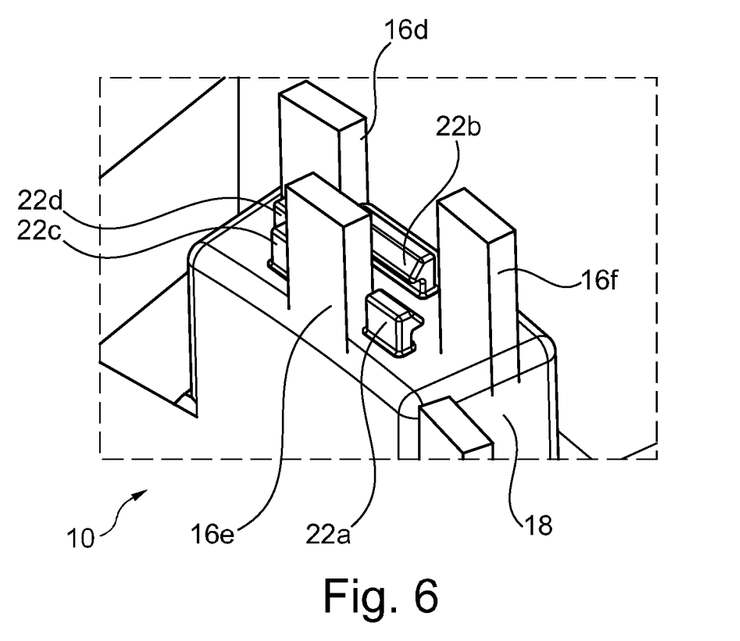
FIG. 6: shows a perspective detail of the sensor fastener from FIG. 5.
Figure 7:
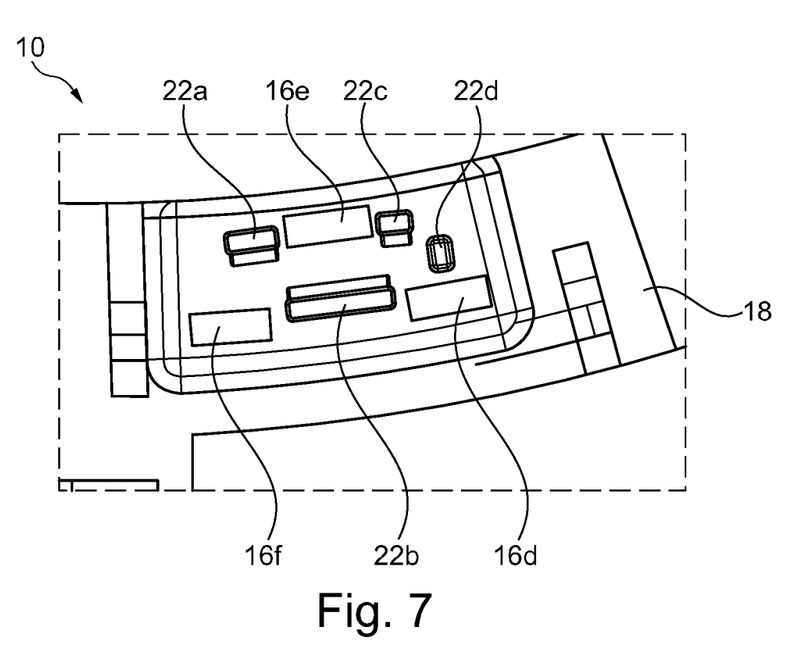
FIG. 7: shows a plan view of the sensor fastener from FIG. 5.
Figure 8:
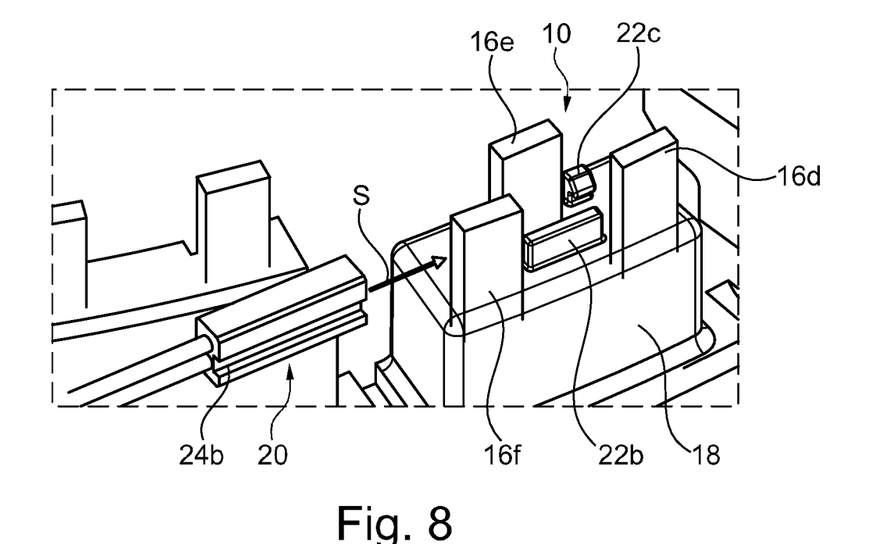
FIG. 8: shoes a perspective view of the temperature sensor from FIG. 1 and the sensor fastener from FIG. 5.

FIGS. 6 and 7 show an interface of the temperature sensor 20, comprising, for example, four connecting ring abutment means 22*a*, 22*b*, 22*c*, 22*d*. The fourth connecting ring abutment means 22*d*, designed as stop means or a holding element, serve to bring the temperature sensor 20 into an end position or to limit it there. The mounting direction of the temperature sensor 20 is shown as the pushing direction S, see FIG. 8. The lateral connecting ring abutment means 22*a*, 22*b*, 22*c* are designed, for example, as latches and clamp the temperature sensor 20 so that it does not change its position undesirably in the last assembly step, see FIG. 9.

Figure 9:
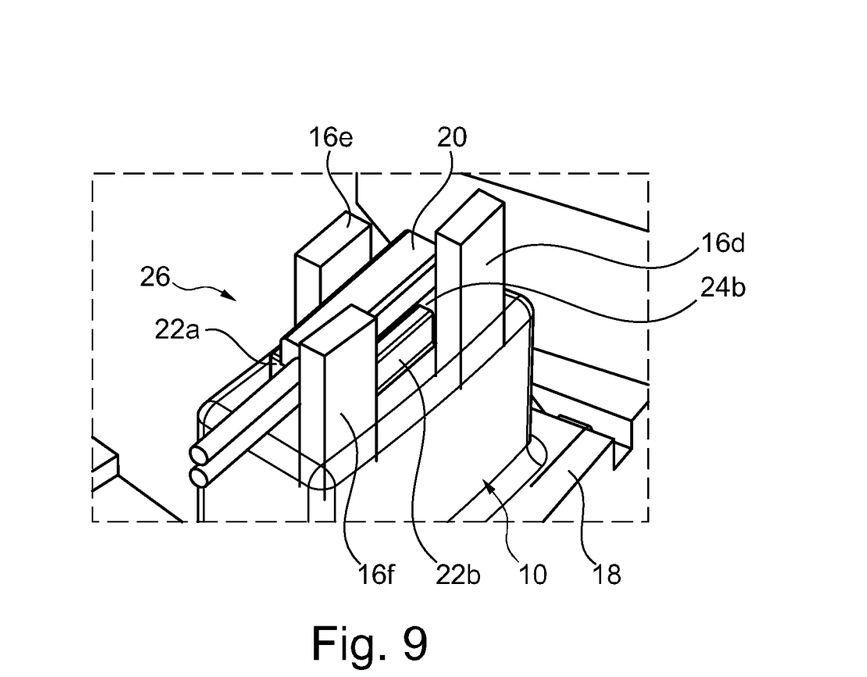
FIG. 9: shows a perspective view of a stator assembly having the temperature sensor from FIG. 1 and the sensor fastener from FIG. 5.

FIG. 9 discloses the end position of the temperature sensor 20, which is preferably coated or encased in a final assembly step with an insulating material, not shown, for example epoxy. This is done in order to isolate open weld points at free ends 16*a*, 16*b*, 16*c*, 16*d*, 16*e*, 16*f*, 16*g* of the bending elements 14*a*, 14*b*, 14*c*, 14*d*, 14*e*, 14*f*, 14*g*. Since the temperature sensor 20 is at approximately the same height as any weld points on the busbars 12*a*, 12*b*, 12*c*, this process can be used to hold the temperature sensor 20 in position and at the same time to thermally insulate it accordingly.

Finally, the temperature sensor 20 is pressed directly between the busbars 12*a*, 12*b*, 12*c* and is largely protected from environmental influences by the insulation by epoxy dipping. This means that there are no media streams, for example: water, air or oil, directly on the temperature sensor 20, so that it remains protected.

LIST OF REFERENCE SIGNS

10 Sensor fastener
12 Busbar assembly
12*a* First busbar
12*b* Second busbar
12*c* Third busbar
14*a* First bending element of the second busbar
14*b* Second bending element of the second busbar
14*c* Third bending element of the second busbar
14*d* Fourth bending element of the second busbar
14*e* Fifth bending element of the second busbar
14*f* First bending element of the first busbar
14*g* Second bending element of the first busbar
16*a* Free end of the first bending element of the second busbar
16*b* Free end of the second bending element of the second busbar
16*c* Free end of the third bending element of the second busbar
16*d* Free end of the fourth bending element of the second busbar
16*e* Free end of the fifth bending element of the second busbar
16*f* Free end of the first bending element of the first busbar
16*g* Free end of the second bending element of the first busbar
18 Connecting ring
20 Temperature sensor
22*a* First connecting ring abutment means
22*b* Second connecting ring abutment means
22*c* Third connecting ring abutment means
22*d* Fourth connecting ring abutment means
24*a* First temperature sensor abutment means
24*b* Second temperature sensor abutment means
26 Stator assembly
S Pushing direction

The invention claimed is:

1. A sensor fastener for measuring a temperature on at least one busbar assembly having at least one busbar, said at least one busbar assembly being arranged in an electric machine with a rotational axis, for driving a motor vehicle, comprising:
a busbar assembly having at least one busbar, wherein one or more busbars have a plurality of bending elements, each of which has a free end;
a connecting ring for connecting to the busbar assembly, the bending elements extending through the connecting ring such that the free ends of the bending elements are free-standing in such a manner that the temperature of the free ends can be measured by a temperature sensor;
wherein the free ends of the bending elements for measuring a temperature are configured for contact with a temperature sensor in a radial direction relative to the rotational axis of the electric machine such that the temperature sensor can be positioned radially between at least two bending elements having radially offset free ends.

2. The sensor fastener according to claim 1, wherein the sensor fastener is configured for a releasable connection to a temperature sensor, wherein the connecting ring has at least one connecting ring abutment for interacting in a releasably connecting manner with at least one temperature sensor abutment of a temperature sensor.

3. The sensor fastener according to claim 1, wherein the sensor fastener is configured for at least one of a force-fitting or a form-fitting connection with a temperature sensor, wherein the connecting ring has at least one connecting ring abutment for interacting in a connecting manner with at least one temperature sensor abutment of a temperature sensor, or wherein the bending elements are configured for interacting in at least one of a force-fitting or a form-fitting connecting manner with a temperature sensor.

4. The sensor fastener according to claim 1, wherein at least one of the bending elements are configured such that their free ends are arranged radially offset to the rotational axis, or the sensor fastener has at least one connecting ring abutment which is arranged radially offset to the rotational axis in order to arrange a temperature sensor between the radially offset free ends or between the radially offset connecting ring abutment.

5. The sensor fastener according to claim 1, wherein the sensor fastener is configured to receive a temperature sensor via a pushing movement, wherein the pushing movement extends along a pushing direction(S) lateral to the rotational axis.

6. The sensor fastener according to claim 1, wherein the sensor fastener has at least one connecting ring abutment including at least one of a latch or a stop.

7. The sensor fastener according to claim 1, wherein the busbar assembly has three busbars.

8. A stator assembly, having at least one sensor fastener for an electric machine with the sensor fastener according to claim 1, further comprising at least one temperature sensor.

9. The stator assembly according to claim 8, wherein the at least one temperature sensor and the at least one sensor fastener have an epoxy coating in a connected state.

10. A sensor fastener for measuring a temperature of a busbar assembly element in an electric machine, the sensor fastener comprising:
   a busbar assembly having at least one busbar including a plurality of bending elements each having a free end; and
   a connecting ring connected with the busbar assembly such that each one of the plurality of bending elements extends through the connecting ring and the free ends of the bending elements are exposed and configured to be engaged with a temperature sensor, and the sensor fastener is configured to engage with the temperature sensor via a form-fitting or a force-fitting;
   wherein the free ends of the bending elements for measuring a temperature are configured for contact with a temperature sensor in a radial direction relative to the rotational axis of the electric machine such that a temperature sensor can be positioned radially between at least two bending elements having radially offset free ends.

11. The sensor fastener according to claim 10, wherein the sensor fastener is configured for a releasable connection to a temperature sensor, wherein the connecting ring has at least one abutment configured to releasably connect with a corresponding temperature sensor abutment of the temperature sensor.

12. The sensor fastener according to claim 10, wherein the busbar assembly has three busbars.

13. The sensor fastener according to claim 10, wherein the sensor fastener has at least one connecting ring abutment including at least one of a latch or a stop.

14. The sensor fastener according to claim 10, wherein the sensor fastener is configured to receive a temperature sensor via a pushing movement, wherein the pushing movement extends along a pushing direction(S) lateral to a rotational axis of the electric machine.

* * * * *